Sept. 14, 1937.    W. STAHLECKER    2,093,255
SPINDLE BEARING
Filed April 25, 1935
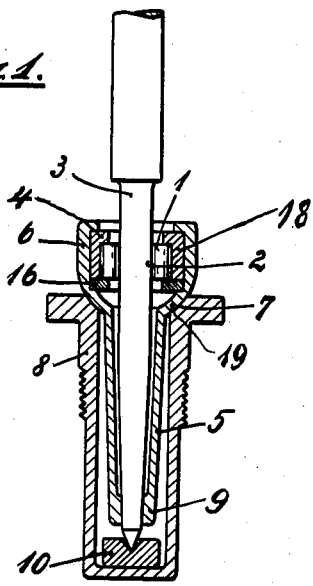
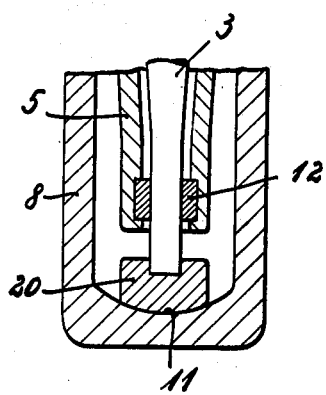
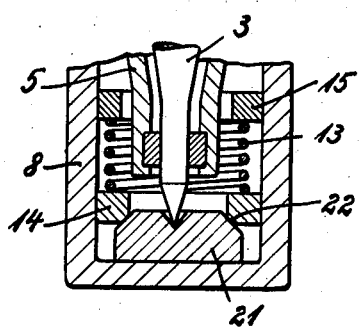
Inventor:
Wilhelm Stahlecker
by Karl Michaelis
Atty.

Patented Sept. 14, 1937

2,093,255

UNITED STATES PATENT OFFICE 2,093,255

SPINDLE BEARING

Wilhelm Stahlecker, Bad Cannstatt, near Stuttgart, Germany

Application April 25, 1935, Serial No. 18,105
In Germany July 23, 1934

8 Claims. (Cl. 308—152)

My invention relates to bearings and more especially to bearings for high speed spindles. It is particularly concerned with the support of such spindles in substantially vertical position, in which the spindle is supported on a step bearing of some suitable kind, its upper part being surrounded by a neck bearing having the form of an anti-friction bearing (ball or roller bearing).

It is an object of my invention to provide a spindle bearing of the kind above described, which is arranged to allow the spindle a damped pendulum motion.

To this end the upper neck bearing is associated with a spherical seat and the step bearing, instead of being rigidly connected with the movable neck bearing, is arranged separately in the casing surrounding the spindle and supporting the bearings in such manner as to be capable of executing a movement in transverse direction which is damped to comply with all requirements.

To the upper neck bearing is apportioned another lower neck bearing, which is preferably located near the step bearing and is rigidly connected with the first or upper neck bearing. This lower neck bearing mainly serves for adjusting the upper neck bearing in a particularly easy and efficient manner on its spherical seat, in accordance with the movements of the spindle, without the adjusting forces being required to be transmitted through the revolution bodies of the antifriction bearing.

In the drawing affixed to this specification and forming part thereof, three forms of a spindle bearing embodying my invention are illustrated diagrammatically by way of example.

In the drawing:

Fig. 1 is an axial section of the first form, while

Figs. 2 and 3 are similar views, drawn to a larger scale, of the bottom portions of the other two modifications.

Referring to the drawing and first to Fig. 1, I are the cylindrical rollers of the upper neck bearing, which run directly on a cylindrical surface 2 of the spindle shaft 3. The rollers I are guided in a well known manner in the outer race 18, being held between two rigid rings, one of which (4) is formed in one piece with the race 18, while the other one 16 is formed separately. The roller bearing is mounted in a sleeve 6 formed with a spherical surface which is seated on a spherical seat 7 of the spindle casing 8. Preferably the centre of curvature of the spherical seat is situated substantially in the centre of the neck bearing. 5 is an extension of the bearing sleeve 6, which is formed as another neck bearing 9 embracing the bottom end of the spindle shaft 3.

10 is the step plate supporting the bottom end of the spindle shaft 3. This plate is arranged for free radial slidable motion on the bottom of the casing 8. I prefer filling the bottom part of the casing around the step plate 10 with a liquid such as oil, which serves for damping the oscillations of the spindle shaft and for lubricating the step and lower neck bearings.

The spindle shaft 3 may rest with its point on the step plate 10, as shown in the drawing, it is however also possible to guide this plate in vertical and horizontal direction by a plane bottom surface and a cylindrical lateral surface.

On the other hand it is not necessary that the step plate 10 rest on a plane surface of the spindle casing 8.

In many cases it may prove more advantageous to seat the step plate on a revolution surface, the deepest point of which is located in an extension of the spindle axis and which rises on all sides, such as a spherical or conical surface. This is illustrated in Fig. 2, where 20 is the step plate, while 11 is the spherical bottom of the spindle casing 8. In this arrangement the weight of the spindle shaft 3 and the parts carried by it must always be lifted when the step bearing executes a lateral movement, and this brings about an additional damping of its oscillations.

As further shown in Fig. 2, the extension 5 of the sleeve need not form itself the lower neck bearing, but a separate neck bearing 12 may be mounted in this extension.

In the modification illustrated in Fig. 3 the step plate 21 is acted upon by a compression spring 13 inserted between an intermediate ring 14 resting on the step plate 21 and a ring 15 fixed in the casing 8. The contact surface between the step plate and the movable ring 14 may have conical or spherical form as shown at 22 in Fig. 3, where the step plate is influenced by the ring 14 forced down upon it by spring 13 to retain its central position in the casing 8.

The new bearing here shown and described is particularly suitable for use in connection with high speed spindles of any kind and quite particularly for spinning spindles, which cannot always be kept perfectly balanced during operation.

I wish it to be understood that I do not desire to be limited to the exact details of construction shown and described for obvious modifications will occur to a person skilled in the art.

I claim:—

1. A spindle bearing comprising in combination, a spindle shaft, three superposed bearings for said shaft, namely an upper antifriction neck bearing surrounding the upper part of said shaft, a separate laterally slidable step bearing in direct contact with and supporting said shaft, another neck bearing surrounding the lower part of said shaft and arranged near and above said step bearing and a sleeve rigidly connecting said two neck bearings, said sleeve being supported for pendulum motion separately from said step bearing, said spindle shaft being arranged to directly control the lateral sliding motion of and to have its oscillations damped by said step bearing.

2. A spindle bearing comprising in combination, a spindle shaft, three superposed bearings for said shaft, namely an upper antifriction neck bearing surrounding the upper part of said shaft, a separate laterally slidable step bearing in direct contact with and supporting said shaft, another neck bearing surrounding the lower part of said shaft and arranged near and above said step bearing and a sleeve rigidly connecting said two neck bearings, said sleeve being formed with a spherical surface enabling it to execute a pendulum motion separately from said step bearing, said spindle shaft being arranged to directly control the lateral sliding motion of and to have its oscillations damped by said step bearing.

3. A spindle bearing comprising in combination, a spindle shaft, three superposed bearings for said shaft, namely an upper antifriction neck bearing surrounding the upper part of said shaft, a separate laterally slidable step bearing in direct contact with and supporting said shaft, another neck bearing surrounding the lower part of said shaft and arranged near and above said step bearing and a sleeve rigidly connecting said two neck bearings, said sleeve being formed with a spherical surface enabling it to execute a pendulum motion separately from said step bearing, said spindle shaft being arranged to directly control the lateral sliding motion of and to have its oscillations damped by said step bearing, the centre of curvature of the spherical surface of said sleeve being located approximately in the centre point of said upper neck bearing.

4. A spindle bearing comprising in combination, a spindle shaft, three superposed bearings for said shaft, namely an upper antifriction neck bearing surrounding the upper part of said shaft, a separate laterally slidable step bearing in direct contact with and supporting said shaft, another neck bearing surrounding the lower part of said shaft and arranged near and above said step bearing and a sleeve rigidly connecting said two neck bearings, said sleeve being supported for pendulum motion separately from said step bearing, said spindle shaft being arranged to directly control the lateral sliding motion of and to have its oscillations damped by said step bearing, said upper neck bearing comprising cylindrical rollers arranged to roll directly on a cylindrical surface of said spindle shaft.

5. A spindle bearing comprising in combination, a spindle shaft, three superposed bearings for said shaft, namely an upper antifriction neck bearing surrounding the upper part of said shaft, a separate laterally slidable step bearing in direct contact with and supporting said shaft, another neck bearing surrounding the lower part of said shaft and arranged near and above said step bearing and a sleeve rigidly connecting said two neck bearings, said sleeve being supported for pendulum motion separately from said step bearing, said spindle shaft being arranged to directly control the lateral sliding motion of and to have its oscillations damped by said step bearing, a casing surrounding said step bearing and a body of damping liquid in said casing.

6. A spindle bearing comprising in combination, a spindle shaft, three superposed bearings for said shaft, namely an upper antifriction neck bearing surrounding the upper part of said shaft, a separate laterally slidable step bearing in direct contact with and supporting said shaft, another neck bearing surrounding the lower part of said shaft and arranged near and above said step bearing and a sleeve rigidly connecting said two neck bearings, said sleeve being supported for pendulum motion separately from said step bearing, said spindle shaft being arranged to directly control the lateral sliding motion of and to have its oscillations damped by said step bearing, said step bearing being formed with a cylindrical bottom surface and a casing surrounding said step bearing and being formed with a hollow-cylindrical guide surface for said step bearing.

7. A spindle bearing comprising in combination, a spindle shaft, three superposed bearings for said shaft, namely an upper antifriction neck bearing surrounding the upper part of said shaft, a separate laterally slidable step bearing in direct contact with and supporting said shaft, another neck bearing surrounding the lower part of said shaft and arranged near and above said step bearing and a sleeve rigidly connecting said two neck bearings, said sleeve being supported for pendulum motion separately from said step bearing, said spindle shaft being arranged to directly control the lateral sliding motion of and to have its oscillations damped by said step bearing, and additional means for forcing said step bearing downwardly.

8. A spindle bearing comprising in combination, a spindle shaft, three superposed bearings for said shaft, namely an upper antifriction neck bearing surrounding the upper part of said shaft, a separate laterally slidable step bearing in direct contact with and supporting said shaft, another neck bearing surrounding the lower part of said shaft and arranged near and above said step bearing and a sleeve rigidly connecting said two neck bearings, said sleeve being supported for pendulum motion separately from said step bearing, said spindle shaft being arranged to directly control the lateral sliding motion of and to have its oscillations damped by said step bearing, additional means for forcing said step bearing downwardly, and a sloping contact surface formed on said additional forcing means for centering said step bearing.

WILHELM STAHLECKER.